United States Patent
Yang et al.

(10) Patent No.: US 12,137,470 B2
(45) Date of Patent: Nov. 5, 2024

(54) METHOD FOR DETERMINING SEARCH SPACE PARAMETER, AND TERMINAL DEVICE

(71) Applicant: VIVO MOBILE COMMUNICATION CO., LTD., Guangdong (CN)

(72) Inventors: Yu Yang, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 633 days.

(21) Appl. No.: 17/147,268

(22) Filed: Jan. 12, 2021

(65) Prior Publication Data

US 2021/0136773 A1 May 6, 2021

Related U.S. Application Data

(63) Continuation of application No. PCT/CN2019/094683, filed on Jul. 4, 2019.

(30) Foreign Application Priority Data

Jul. 13, 2018 (CN) .................... 201810772269.X

(51) Int. Cl.
*H04W 72/53* (2023.01)
*H04B 7/06* (2006.01)
(Continued)

(52) U.S. Cl.
CPC .......... *H04W 72/53* (2023.01); *H04B 7/0626* (2013.01); *H04W 56/001* (2013.01);
(Continued)

(58) Field of Classification Search
None
See application file for complete search history.

(56) References Cited

U.S. PATENT DOCUMENTS

2015/0139123 A1   5/2015  McBeath et al.
2015/0305065 A1  10/2015  Bai et al.
(Continued)

FOREIGN PATENT DOCUMENTS

CN   104919883 A   9/2015
CN   107590291 A   1/2018
(Continued)

OTHER PUBLICATIONS

EP Search Report in Application No. 19833312.2 dated Jul. 20, 2021.
(Continued)

*Primary Examiner* — Saad Khawar
(74) *Attorney, Agent, or Firm* — Price Heneveld LLP

(57) ABSTRACT

Embodiments of this disclosure disclose a method for determining a search space parameter and a terminal device. The method includes: receiving dedicated signaling, where the dedicated signaling is used to configure a TCI state of a CORESET #0 for the terminal device, and a Source RS indicated by the TCI state of the CORESET #0 is a CSI-RS; determining a target SSB having a first association relationship with the CSI-RS; and determining parameter information of a search space #0 in the CORESET #0 based on the target SSB.

17 Claims, 2 Drawing Sheets

(51) Int. Cl.
  *H04W 56/00* (2009.01)
  *H04W 72/044* (2023.01)
  *H04W 72/0446* (2023.01)
  *H04W 72/0453* (2023.01)
  *H04W 72/23* (2023.01)
  *H04W 80/02* (2009.01)

(52) U.S. Cl.
  CPC ... *H04W 72/0446* (2013.01); *H04W 72/0453* (2013.01); *H04W 72/046* (2013.01); *H04W 72/23* (2023.01); *H04W 80/02* (2013.01)

(56) References Cited

U.S. PATENT DOCUMENTS

| | | | |
|---|---|---|---|
| 2019/0141693 A1* | 5/2019 | Guo | H04W 72/1268 |
| 2019/0159226 A1* | 5/2019 | Ly | H04L 5/0053 |
| 2019/0174466 A1* | 6/2019 | Zhang | H04L 5/0057 |
| 2019/0379431 A1 | 12/2019 | Park et al. | |
| 2020/0280938 A1 | 9/2020 | Liu | |
| 2021/0084623 A1 | 3/2021 | Zhang et al. | |
| 2021/0084640 A1 | 3/2021 | Kang et al. | |

FOREIGN PATENT DOCUMENTS

| | | |
|---|---|---|
| CN | 107949064 A | 4/2018 |
| CN | 108064466 A | 5/2018 |
| CN | 108199819 A | 6/2018 |
| JP | 2020506585 A | 2/2020 |
| WO | 2018128376 A1 | 7/2018 |
| WO | 2018128410 A1 | 7/2018 |

OTHER PUBLICATIONS

"Summary 2 on Remaing issues on Beam Failure Recovery" MediaTek Inc., 3GPP TSG RAN WG1 Meeting #93, R1-1807796, May 21, 2018.
Spreadtrum Communications, "Remaining issues on beam management," 3GPP TSG RAN WG1 Meeting #93, R1-1806394, pp. 1-5, (May 25, 2018).
Huawei et al., "Remaining issues with BFR-config, " 3GPP TSG-RAN WG2 Meeting 102, R2-1808413, pp. 1-4, (May 25, 2018).
Vivo, Misalignment for common search space in PDCCH-configCommon and the MIB, R2-1807725, pp. 1-3, (May 25, 2018).
Ericsson, Remaining issues on beam measurement and reporting, R1-1806217, pp. 1-13, (May 25, 2018).
Ericsson, Feature lead summary 3 for beam measurement and reporting, R1-1807782, pp. 1-41, (May 25, 2018).
Written Opinion and International Search Report mailed Jan. 28, 2021 received in Application No. PCT/CN2019/094683.
CN Search Report dated Apr. 16, 2020 as received in Application No. 201810772269.X.
CN Office Action dated May 11, 2020 as received in Application No. 201810772269.X.
Japanese Office Action dated Jan. 4, 2022 as received in application No. 2021-500214.
"Remaining issues on beam measurement and reporting" 3GPP TSG RAN WG1 Meeting #93, R1-1806044, May 21, 2018. VIVO.
Ericsson., "Remaining issues of PDCCH," 3GPP TSG-RAN WG1 Meeting #93, R1-1807246, pp. 1-4, (May 21-25, 2018).
KR Office Action dated Sep. 26, 2023 as received in Application No. 10-2021-7003712.

* cited by examiner

METHOD FOR DETERMINING SEARCH SPACE PARAMETER, AND TERMINAL DEVICE

CROSS-REFERENCE TO RELATED APPLICATIONS

This application is a continuation application of International Application No. PCT/CN2019/094683 filed on Jul. 4, 2019, which claims priority to Chinese Patent Application No. 201810772269.X, filed in China on Jul. 13, 2018, which is incorporated herein by reference in its entirety.

TECHNICAL FIELD

This disclosure relates to the communications field, and in particular, to a method and a terminal for determining a search space parameter.

BACKGROUND

The fifth generation (5G) mobile communications system new radio (NR) has introduced a massive antenna technology, which can better support a multi-user multiple-input multiple-output (MU-MIMO) antenna technology. In order to reduce device cost and complexity of baseband processing caused by large-scale antenna arrays, a hybrid digital-analog beamforming technology is used to roughly match transmitted signals with channels.

However, in the hybrid digital-analog beamforming technology, there still lacks a scheme for determining parameter information of a search space (search space #0) in a control resource set (CORESET #0) based on configuration information of a CORESET #0, which prevents search space #0 from being accurately monitored.

SUMMARY

An objective of embodiments of this disclosure is to provide a method and a terminal device for determining a search space parameter to solve a problem in related technologies that a terminal device is unable to accurately determine parameter information of a search space #0.

According to a first aspect, an embodiment of this disclosure provides a method for determining a search space parameter, applied to a terminal device, where the method includes:
   receiving dedicated signaling, where the dedicated signaling is used to configure a TCI state of a CORESET #0 for the terminal device, and a Source RS indicated by the TCI state of the CORESET #0 is a CSI-RS;
   determining a target SSB having a first association relationship with the CSI-RS; and
   determining parameter information of a search space #0 in the CORESET #0 based on the target SSB.

According to a second aspect, an embodiment of this disclosure further provides a terminal device, including:
   a receiving module, configured to receive dedicated signaling, where the dedicated signaling is used to configure a TCI state of a CORESET #0 for the terminal device, and a Source RS indicated by the TCI state of the CORESET #0 is a CSI-RS;
   a first determining module, configured to determine a target SSB having a first association relationship with the CSI-RS; and
   a second determining module, configured to determine parameter information of a search space #0 in the CORESET #0 based on the target SSB.

According to a third aspect, an embodiment of this disclosure further provides a terminal device, where the terminal device includes a processor, a memory, and a computer program stored in the memory and capable of running on the processor, where when the computer program is executed by the processor, steps of the method for determining a space search parameter according to the first aspect are implemented.

According to a fourth aspect, an embodiment of this disclosure further provides a computer-readable storage medium, where the computer-readable storage medium stores a computer program. When the computer program is executed by a processor, the steps of the method for determining a space search parameter according to the first aspect are implemented.

In the embodiments of this disclosure, a TCI state of a CORESET #0 is configured for a terminal device by using dedicated signaling. When a Source RS indicated by the TCI state of the CORESET #0 is a CSI-RS, the terminal device determines a target SSB having a first association relationship with the CSI-RS, so that the terminal device can accurately determine parameter information of a search space #0 based on the target SSB, and then accurately monitoring the search space #0 by the terminal device is effectively implemented.

BRIEF DESCRIPTION OF DRAWINGS

The drawings described herein are intended for a further understanding of this disclosure and constitute a part of this disclosure. Example embodiments of this disclosure and descriptions thereof are intended to explain this disclosure, and do not constitute any inappropriate limitation on this disclosure. In the drawings.

DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

Figure 1:
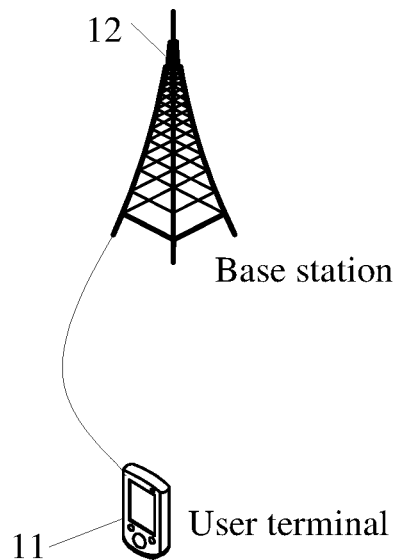
FIG. 1 is a schematic diagram of a network architecture according to an embodiment of this disclosure.

FIG. 1 is a schematic diagram of a network architecture according to an embodiment of this disclosure. As shown in FIG. 1, the network architecture includes a user terminal 11 and a base station 12. The user terminal 11 may be user equipment (UE), for example, may be a terminal-side device such as a mobile phone, a tablet computer, a laptop computer, a personal digital assistant (PDA), a mobile internet device (MID), or a wearable device. It should be noted that the user terminal 11 is not limited to any specific type in this embodiment of this disclosure. The base station 12 may be a base station (for example, a gNB or a 5G NR NB) in 5G or a later release, or a base station in another communications system, or referred to as a NodeB. It should be noted that a 5G base station is used only as an example in this embodiment of this disclosure, but the base station 12 is not limited to any specific type.

It should be noted that specific functions of the terminal device 11 and the base station 12 are described in detail by using the following embodiments.

Figure 2:
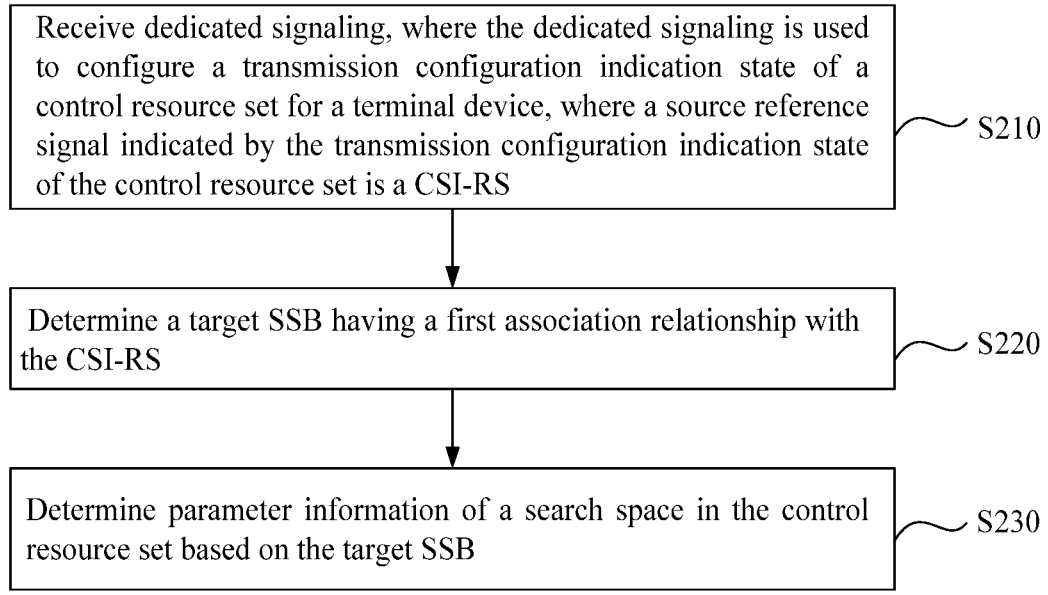
FIG. 2 is a schematic flowchart of a method for determining a search space parameter according to an embodiment of this disclosure.

FIG. 2 is a schematic flowchart of a method for determining a search space parameter according to an embodiment of this disclosure. The method is applied to a terminal device, and may be illustrated as follows.

Step 210. Receive dedicated signaling, where the dedicated signaling is used to configure a transmission configuration indication state (TCI state) of a CORESET #0 for a terminal device. A source reference signal (Source RS) indicated by the TCI state of the CORESET #0 is a channel state information reference signal (CSI-RS).

Step 220. Determine a target synchronization signal block (SSB) having a first association relationship with the CSI-RS.

Step 230. Determine parameter information of a search space #0 in the CORESET #0 based on the target SSB.

In practical applications, a network-side device configures related information of the CORESET #0 for the terminal device through a physical broadcast channel (PBCH). The PBCH is a component of an SSB, and the CORESET #0 is in spatial quasi-colocation (spatial QCL) with the SSB in which the PBCH is located. Therefore, the terminal device can determine the parameter information of the search space #0 in the CORESET #0 based on the SSB in which the PBCH for configuring the related information of the CORESET #0 is located.

In some embodiments, the network-side device configures the TCI state of the CORESET #0 for the terminal device through a PBCH, where an SSB in which the PBCH is located is a first SSB. During physical downlink shared channel (PDSCH) scheduling, the network-side device sends downlink control information (DCI) for scheduling a PDSCH to the terminal device. If a time offset between a receiving moment at which the terminal device receives the DCI and a receiving moment at which the terminal device receives the PDSCH is less than a preset threshold, the terminal device receives the PDSCH based on TCI state information of a CORESET having a smallest ID on a bandwidth part (BWP) in an activated state in a current serving cell, that is, the terminal device receives the PDSCH based on QCL information of the CORESET #0 configured by the PBCH in the first SSB.

However, if the terminal device has switched SSB from the first SSB to a second SSB due to a location change, and the network-side device unaware of this sends a PDSCH still based on the QCL information of the CORESET #0 configured by the PBCH in the first SSB, the network-side device and the terminal device fail to correctly transmit data during PDSCH scheduling.

In this embodiment of this disclosure, in order to implement flexible configuration of a CORESET #0 and correctly transmit control information on the CORESET #0 between the network-side device and the terminal device, the network-side device configures a TCI state of the CORESET #0 for the terminal device by using dedicated signaling, so that the network-side device and the terminal device have consistent understanding on the TCI state of the CORESET #0, ensuring that the network-side device and the terminal device correctly perform data transmission.

When the network-side device configures the TCI state of the CORESET #0 for the terminal device by using dedicated signaling, a Source RS indicated by the TCI state of the CORESET #0 in this case may be an SSB, or another RS such as a CSI-RS.

In this embodiment of this disclosure, the dedicated signaling includes at least one of the following:

Radio resource control (RRC) signaling, and media access control control element (MAC CE) signaling.

For example, the network-side device configures the TCI state of the CORESET #0 for the terminal device by using RRC signaling; or, the network-side device configures and indicates the TCI state of the CORESET #0 for the terminal device by using RRC signaling and MAC CE signaling, It should be noted that, the TCI state of the CORESET #0 refers to an RS in a reference signal set (RS set), that is, a source RS.

When the terminal device receives the dedicated signaling sent by the network-side device for configuring the TCI state of the CORESET #0, and determines that the Source RS indicated by the TCI state of the CORESET #0 configured by the network-side device is a CSI-RS, that is, the CORESET #0 is in quasi-colocation (QCL) with the CSI-RS, to determine parameter information of a search space #0 in the CORESET #0, the terminal device needs to determine a target SSB having a first association relationship with the CSI-RS, and then determine the parameter information of the search space #0 based on the target SSB.

In this embodiment of this disclosure, the first association relationship is that the CSI-RS is in quasi-colocation (QCL) with the target SSB.

Optionally, the first association relationship is that the CSI-RS is at least in spatial QCL with the target SSB.

In this embodiment of this disclosure, the determining a target SSB having an association relationship with the CSI-RS includes:

determining a TCI state of the CSI-RS; and
determining the target SSB based on the TCI state of the CSI-RS.

In order to determine the target SSB having the first association relationship with the CSI-RS indicated by the TCI state of the CORESET #0, the terminal device first determines the TCI state of the CSI-RS, where the TCI state of the CSI-RS is configured or indicated by the network-side device.

In practical applications, a TCI state of an RS configured or indicated by a network-side device for a terminal device is used to indicate QCL information of the RS. When the TCI state is used to indicate the QCL information of the RS, a Source RS and a target reference signal Target RS indicated by the TCI state of the CSI-RS may be as follows: the Source RS is an SSB, and the Target RS is a periodic channel state information reference signal (P-CSI-RS)/a semi-persistent channel state information reference signal (SP-CSI-RS); the Source RS is a P-CSI-RS, and the Target RS is a P-CSI-RS; or the Source RS is an SSB/P-CSI-RS/SP-CSI-RS, and the target RS is an aperiodic channel state information reference signal (AP-CSI-RS). The Source RS is in QCL with the Target RS.

The terminal device may determine the target SSB based on the TCI state of the CSI-RS in at least the following two manners.

Manner 1:

In this embodiment of this disclosure, the determining the target SSB based on the TCI state of the CSI-RS includes:

if a Source RS indicated by the TCI state of the CSI-RS is a first SSB, determining the first SSB as the target SSB.

The Source RS indicated by the TCI state of the CSI-RS configured or indicated by the network-side device is the first SSB, that is, the CSI-RS is in QCL with the first SSB. Therefore, the terminal device can determine the first SSB as the target SSB.

Manner 2:

In this embodiment of this disclosure, the determining the target SSB based on the TCI state of the CSI-RS includes:

if a Source RS indicated by the TCI state of the CSI-RS is a target RS, determining a second SSB having a second association relationship with the target RS, where the target RS is an RS other than an SSB; and determining the second SSB as the target SSB.

In this embodiment of this disclosure, the second association relationship is that the target RS is in QCL with the second SSB.

Optionally, the second association relationship is that the target RS is at least in spatial QCL with the second SSB.

When the Source RS indicated by the TCI state of the CSI-RS configured or indicated by the network-side device is a target RS, and the target RS is an RS other than an SSB, the terminal device needs to determine a target SSB indirectly as follows:

First, the terminal device determines a second SSB having a second association relationship with the target RS, that is, the target RS is in QCL with the second SSB.

The target RS is the Source RS indicated by the TCI state of the CSI-RS, that is, the target RS is in QCL with the CSI-RS.

Therefore, the terminal device indirectly determines that the CSI-RS is in QCL with the second SSB, and can determine the second SSB as the target SSB.

For example, the terminal device receives dedicated signaling sent by the network-side device for configuring the TCI state of the CORESET #0, and determines that a Source RS indicated by the TCI state of the CORESET #0 configured by the network-side device is a first P-CSI-RS.

The terminal device determines a TCI state of the first P-CSI-RS configured or indicated by the network-side device. If a Source RS indicated by the TCI state of the first P-CSI-RS is a target RS (a second P-CSI-RS), which means that the first P-CSI-RS is in QCL with the target RS (the second P-CSI-RS), the terminal device needs to further determine a second SSB having a second association relationship with the target RS (the second P-CSI-RS), which means that the target RS (the second P-CSI-RS) is in QCL with the second SSB. Then the terminal device can indirectly determine that the first P-CSI-RS is in QCL with the second SSB, and can determine the second SSB as the target SSB.

It should be noted that, the terminal device may determine the second SSB having a second association relationship with the target RS in a direct or indirect manner.

a. Direct Manner

A TCI state of the target RS is determined. If a Source RS indicated by the TCI state of the target RS is a second SSB, a terminal device can directly determine the second SSB.

Still using that the target RS is a second P-CSI-RS as an example, the terminal device determines a TCI state of the target RS (the second P-CSI-RS) configured or indicated by the network-side device. If a Source RS indicated by the TCI state of the target RS (the second P-CSI-RS) is a second SSB, which means that the target RS (the second P-CSI-RS) is in QCL with the second SSB, the terminal device can directly determine the second SSB in this case.

b. Indirect Manner

A TCI state of the target RS is determined. If a Source RS indicated by the TCI state of the target RS is an RS other than an SSB, a terminal device determines a second SSB indirectly based on the target RS by: determining a second SSB having an association relationship with the RS, which means that the RS is in QCL with the second SSB. Because the RS is in QCL with the target RS, the terminal device indirectly determines that the target RS is in QCL with the second SSB, that is, indirectly determines the second SSB.

Still using that the target RS is a second P-CSI-RS as an example, the terminal device determines a TCI state of the target RS (the second P-CSI-RS) configured or indicated by the network-side device. If a Source RS indicated by the TCI state of the target RS (the second P-CSI-RS) is a third P-CSI-RS, the third P-CSI-RS is in QCL with the target RS (the second P-CSI-RS).

The terminal device further determines a TCI state of the third P-CSI-RS configured or indicated by the network-side device. If a Source RS indicated by the TCI state of the third P-CSI-RS is a second SSB, the third P-CSI-RS is in QCL with the second SSB.

In this case, the terminal device indirectly determines that the target RS (the second P-CSI-RS) is in QCL with the second SSB, that is, indirectly determines the second SSB.

After determining the target SSB, the terminal device may determine parameter information of a search space #0 in a CORESET #0 based on the target SSB.

The search space #0 is a search space configured in the CORESET #0 and with an index of 0.

In this embodiment of this disclosure, the parameter information of the search space #0 is used to indicate the terminal device to monitor a common search space of a physical downlink control channel (Type® Physical Downlink Control Channel, Type0-PDCCH).

The parameter information of the search space #0 includes at least one of the following:

Time-frequency resource information, and spatial receiving parameter information.

In an embodiment, the terminal device determines, from four most significant bits of pdcch-ConfigSIB1 in a target protocol table, a quantity of consecutive resource blocks (RB) and a quantity of consecutive symbols of the CORESET #0 in which the search space #0 is located, and determines PDCCH monitoring occasions from four least significant bits of pdcch-ConfigSIB1.

In the target protocol, a time offset is defined with respect to a subcarrier spacing of the CORESET #0, from the smallest resource block index (RB index) of the CORESET #0 in which the search space #0 is located to the smallest RB index of a common RB overlapping with the first RB of the target SSB.

For the target SSB and CORESET #0 multiplexing pattern 1 (multiplexing pattern 1), the terminal device monitors a PDCCH in the search space #0 over two consecutive slots starting from slot n0. The terminal device determines an index of slot n0 based on an index of the target SSB. For the target SSB and CORESET #0 multiplexing patterns 2 and 3, the terminal device monitors a PDCCH in the search space #0 over one slot with the periodicity of the search space #0 equal to the periodicity of the target SSB. The terminal device determines an index of the slot based on an index of the target SSB.

Spatial receiving parameters of the search space #0 are the same as spatial receiving parameters of the CORESET #0.

In the technical solutions recorded in the embodiments of this disclosure, a TCI state of a CORESET #0 is configured for a terminal device by using dedicated signaling. When a Source RS indicated by the TCI state of the CORESET #0 is a CSI-RS, the terminal device determines a target SSB having a first association relationship with the CSI-RS, so that the terminal device can accurately determine parameter information of a search space #0 based on the target SSB, and then accurately monitoring the search space #0 by the terminal device is effectively implemented.

Figure 3:
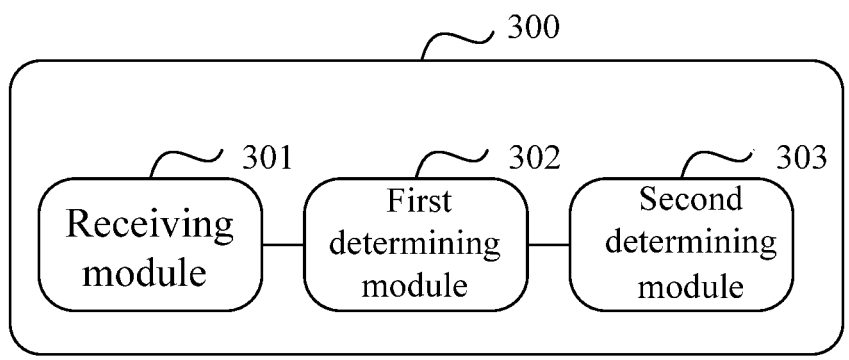
FIG. 3 is a schematic structural diagram of a terminal device according to an embodiment of this disclosure.

FIG. 3 is a schematic structural diagram of a terminal device according to an embodiment of this disclosure. The terminal device 300 shown in FIG. 3 includes:

a receiving module 301, configured to receive dedicated signaling, where the dedicated signaling is used to configure a TCI state of a CORESET #0 for the terminal device 300, and a Source RS indicated by the TCI state of the CORESET #0 is a CSI-RS;

a first determining module 302, configured to determine a target SSB having a first association relationship with the CSI-RS; and a second determining module 303, configured to determine parameter information of a search space #0 in the CORESET #0 based on the target SSB.

It should be noted that, the first determining module 302 and the second determining module 303 may be a same hardware signal processing module having a signal processing function, or may be different software signal processing modules having the signal processing function, which is not specifically limited herein.

Optionally, the first association relationship is that the CSI-RS is in QCL with the target SSB.

Optionally, the first determining module 302 is further configured to:

determine a TCI state of the CSI-RS; and determine the target SSB based on the TCI state of the CSI-RS.

Optionally, the first determining module 302 is further configured to:

if a Source RS indicated by the TCI state of the CSI-RS is a first SSB, determine the first SSB as the target SSB.

Optionally, the first determining module 302 is further configured to:

if a Source RS indicated by the TCI state of the CSI-RS is a target RS, determine a second SSB having a second association relationship with the target RS, where the target RS is an RS other than an SSB; and determine the second SSB as the target SSB.

Optionally, the second association relationship is that the target RS is in QCL with the second SSB.

Optionally, the parameter information of the search space #0 is used to indicate to monitor a common search space of a Type0-PDCCH.

Optionally, the parameter information of the search space #0 includes at least one of the following:

time-frequency resource information and spatial receiving parameter information.

Optionally, the dedicated signaling includes at least one of the following:

RRC signaling, and MAC CE signaling.

The terminal device 300 provided by this embodiment of this disclosure can implement each process implemented by the terminal device in the method embodiment in FIG. 2. Details are not described herein again to avoid repetition.

Figure 4:
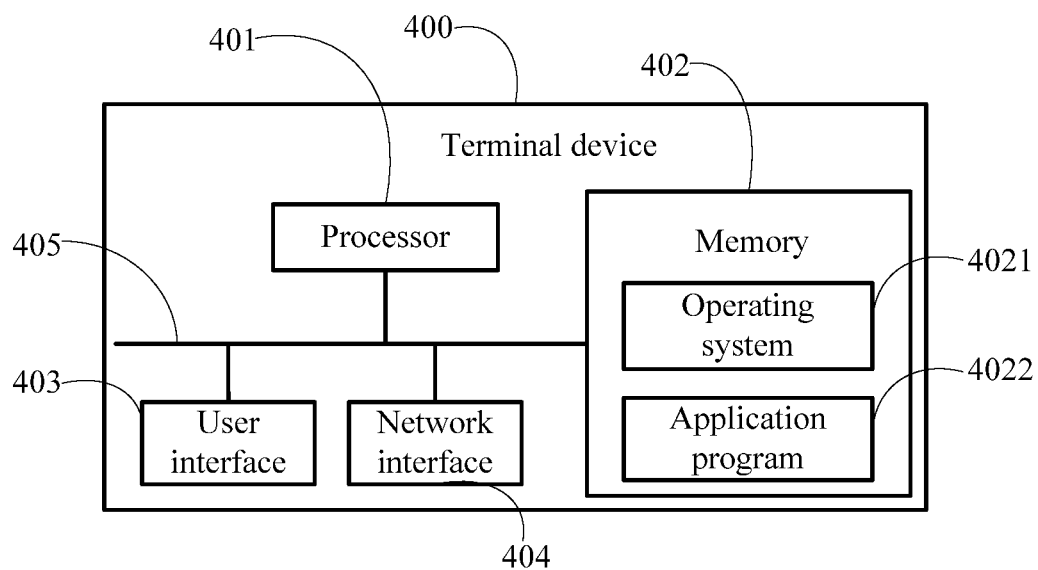
FIG. 4 is a schematic structural diagram of another terminal device according to an embodiment of this disclosure.

FIG. 4 is a schematic structural diagram of another terminal device according to an embodiment of this disclosure. The terminal device 400 shown in FIG. 4 includes at least one processor 401, a memory 402, at least one network interface 404, and a user interface 403. The components in the terminal device 400 are coupled together through a bus system 405. It may be understood that the bus system 405 is configured to implement connection and communication between these components. In addition to a data bus, the bus system 405 further includes a power bus, a control bus, and a status signal bus. However, for clarity of description, various buses are marked as the bus system 405 in FIG. 4.

The user interface 403 may include a display, a keyboard, or a pointing device (for example, a mouse, a trackball (trackball), a touch panel, or a touchscreen).

It can be understood that the memory 402 in this embodiment of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchronous link dynamic random access memory (SLDRAM), and a direct rambus random access memory (DRRAM). The memory 402 of the system and the method described in the embodiments of this disclosure is intended to include but is not limited to these and any other applicable types of memories.

In some embodiments, the memory 402 stores the following elements: executable modules or data structures, or a subset thereof, or an extended set thereof: an operating system 4021 and an application program 4022.

The operating system 4021 includes various system programs, such as a framework layer, a core library layer, and a driver layer, for implementing various basic services and processing hardware-based tasks. The application program 4022 includes various application programs, such as a media player and a browser, which are used to implement various application services. A program for implementing the method in the embodiments of this disclosure may be included in the application program 4022.

In this embodiment of this disclosure, the terminal device 400 further includes a computer program stored in the memory 402 and capable of running on the processor 401. When being executed by the processor 401, the computer program implements the following steps:

receiving dedicated signaling, where the dedicated signaling is used to configure a TCI state of a CORESET #0 for the terminal device, and a Source RS indicated by the TCI state of the CORESET #0 is a CSI-RS; determining a target SSB having a first association relationship with the CSI-RS; and determining parameter information of a search space #0 in the CORESET #0 based on the target SSB.

The method disclosed in the foregoing embodiments of this disclosure may be applied to the processor 401 or implemented by the processor 401. The processor 401 may be an integrated circuit chip, having a signal processing capability. During implementation, the steps of the foregoing method may be completed by hardware integrated logic circuits in the processor 401 or instructions in the form of software. The foregoing processor 401 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor can implement or execute the methods, steps, and logical block diagrams disclosed in the embodiments of this disclosure. The general-purpose processor may be a microprocessor, or the processor may be any conventional processor or the like. The steps of the method disclosed with reference to the embodiments of this disclosure may be directly executed and completed by a hardware decoding processor, or executed and completed by a combination of hardware and software modules in a decoding processor. The software module may be located in a computer-readable storage medium mature in the art, such as a random access memory, a flash memory, a read-only memory, a programmable read-only memory or electrically erasable programmable memory, or a register. The computer-readable storage medium is located in the memory 402, and the processor 401 fetches information in the memory 402, and completes the steps of the foregoing method in combination with its hardware. Specifically, the computer-readable storage medium stores a computer program, where when the computer program is executed by the processor 401, the steps in the method embodiment shown in FIG. 2 are implemented.

It can be understood that the embodiments described in the embodiments of this disclosure may be implemented by hardware, software, firmware, middleware, microcode, or a combination thereof. For hardware implementation, a processing unit may be implemented in one or more application-specific integrated circuits (ASIC), digital signal processors (DSP), digital signal processing devices (DSPD), programmable logic devices (PLD), field programmable gate arrays (FPGA), general-purpose processors, controllers, microcontrollers, microprocessors, other electronic units used to implement the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented inside the processor or outside the processor.

The terminal device 400 is capable of implementing each process implemented by the terminal device in the foregoing method embodiment in FIG. 2. Details are not described herein again to avoid repetition.

An embodiment of this disclosure further provides a computer-readable storage medium, where the computer-readable storage medium stores a computer program, and when the computer program is executed by a processor, each process of the foregoing method embodiment in FIG. 2 is implemented, and a same technical effect can be achieved. Therefore, details are not described herein again to avoid repetition. For example, the computer-readable storage medium is a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A method for determining a search space parameter, applied to a terminal device, wherein the method comprises:
   receiving dedicated signaling, wherein the dedicated signaling is used to configure a transmission configuration indication state (TCI) state of a control resource set (CORESET #0) for the terminal device, and a quasi-colocation (QCL) source reference signal Source (RS) indicated by the TCI state of the CORESET #0 is a channel state information reference signal (CSI-RS);
   determining a target synchronization signal block (SSB) having a first association relationship with the CSI-RS wherein the first association relationship is that the CSI-RS is in QCL with the target SSB; and
   determining parameter information of a search space #0 in the CORESET #0 based on the target SSB;
   wherein the parameter information of the search space #0 comprises time-frequency resource information.

2. The method according to claim 1, wherein the determining a target SSB having an association relationship with the CSI-RS comprises:
   determining a TCI state of the CSI-RS; and
   determining the target SSB based on the TCI state of the CSI-RS.

3. The method according to claim 2, wherein the determining the target SSB based on the TCI state of the CSI-RS comprises:
   if a Source RS indicated by the TCI state of the CSI-RS is a first SSB, determining the first SSB as the target SSB.

4. The method according to claim 2, wherein the determining the target SSB based on the TCI state of the CSI-RS comprises:
   if a Source RS indicated by the TCI state of the CSI-RS is a target reference signal (RS), determining a second SSB having a second association relationship with the target RS, wherein the target RS is an RS other than an SSB; and
   determining the second SSB as the target SSB.

5. The method according to claim 4, wherein the second association relationship is that the target RS is in QCL with the second SSB.

6. The method according to claim 1, wherein the parameter information of the search space #0 is used to indicate to monitor a common search space of a physical downlink control channel (Type0-PDCCH).

7. The method according to claim 1, wherein the parameter information of the search space #0 further comprises:
spatial receiving parameter information.

8. The method according to claim 1, wherein the dedicated signaling comprises at least one of the following:
radio resource control (RRC) signaling and media access control control element (MAC CE) signaling.

9. A terminal device, comprising a processor, a memory, and a computer program stored in the memory and capable of running on the processor, wherein when the computer program is executed by the processor, the processor is configured to perform steps of:
receiving dedicated signaling, wherein the dedicated signaling is used to configure a transmission configuration indication state (TCI) state of a control resource set (CORESET #0) for the terminal device, and a quasi-colocation (QCL) source reference signal Source (RS) indicated by the TCI state of the CORESET #0 is a channel state information reference signal (CSI-RS);
determining a target synchronization signal block (SSB) having a first association relationship with the CSI-RS, wherein the first association relationship is that the CSI-RS is in QCL with the target SSB; and
determining parameter information of a search space #0 in the CORESET #0 based on the target SSB;
wherein the parameter information of the search space #0 comprises time-frequency resource information.

10. The terminal device according to claim 9, wherein when determining a target SSB having an association relationship with the CSI-RS, the processor is configured to perform steps of:
determining a TCI state of the CSI-RS; and
determining the target SSB based on the TCI state of the CSI-RS.

11. The terminal device according to claim 10, wherein when determining the target SSB based on the TCI state of the CSI-RS, the processor is configured to perform steps of:
if a Source RS indicated by the TCI state of the CSI-RS is a first SSB, determining the first SSB as the target SSB.

12. The terminal device according to claim 10, wherein when determining the target SSB based on the TCI state of the CSI-RS, the processor is configured to perform steps of:
if a Source RS indicated by the TCI state of the CSI-RS is a target reference signal (RS), determining a second SSB having a second association relationship with the target RS, wherein the target RS is an RS other than an SSB; and
determining the second SSB as the target SSB.

13. The terminal device according to claim 12, wherein the second association relationship is that the target RS is in QCL with the second SSB.

14. The terminal device according to claim 9, wherein the parameter information of the search space #0 is used to indicate to monitor a common search space of a physical downlink control channel (Type0-PDCCH).

15. The terminal device according to claim 9, wherein the parameter information of the search space #0 further comprises:
spatial receiving parameter information.

16. The terminal device according to claim 9, wherein the dedicated signaling comprises at least one of the following:
radio resource control (RRC) signaling and media access control control element (MAC CE) signaling.

17. A non-transitory computer-readable storage medium, wherein the computer-readable storage medium stores a computer program, and when the computer program is executed by a processor, the processor is configured to perform steps of:
receiving dedicated signaling, wherein the dedicated signaling is used to configure a transmission configuration indication state (TCI) state of a control resource set (CORESET #0) for the terminal device, and a quasi-colocation (QCL) source reference signal Source (RS) indicated by the TCI state of the CORESET #0 is a channel state information reference signal (CSI-RS);
determining a target synchronization signal block (SSB) having a first association relationship with the CSI-RS, wherein the first association relationship is that the CSI-RS is in QCL with the target SSB; and
determining parameter information of a search space #0 in the CORESET #0 based on the target SSB;
wherein the parameter information of the search space #0 comprises time-frequency resource information.

* * * * *